United States Patent [19]

Harelstad

[11] Patent Number: 5,073,287
[45] Date of Patent: Dec. 17, 1991

[54] COATING REMOVER AND PAINT STRIPPER CONTAINING N-METHYL-2-PYRROLIDONE, METHANOL, AND SODIUM METHOXIDE

[75] Inventor: Wayne Harelstad, Bloomington, Minn.

[73] Assignee: Fremont Industries, Inc., Shakopee, Minn.

[21] Appl. No.: 552,573

[22] Filed: Jul. 16, 1990

[51] Int. Cl.$^5$ .......................... C09D 9/00; C11D 7/32
[52] U.S. Cl. ....................................... 252/153; 134/38; 252/158; 252/162; 252/170; 252/171; 252/364; 252/542; 252/DIG. 8
[58] Field of Search ............... 252/153, 162, 170, 171, 252/364, 542, DIG. 9, DIG. 8, 158; 134/38

[56] References Cited

U.S. PATENT DOCUMENTS

| | | | |
|---|---|---|---|
| 4,085,059 | 4/1978 | Smith et al. | 252/118 |
| 4,276,186 | 6/1981 | Bakos et al. | 252/171 |
| 4,518,675 | 5/1985 | Kataoka | 430/256 |
| 4,556,754 | 12/1985 | Kampf et al. | 585/664 |
| 4,675,402 | 6/1987 | Schinzel | 544/213 |
| 4,764,222 | 8/1988 | Colegrove | 134/38 |
| 4,788,002 | 11/1988 | King, Sr. | 252/364 |
| 4,812,255 | 3/1981 | Suwala | 252/142 |
| 4,828,569 | 5/1989 | Heath et al. | 8/137 |
| 4,906,303 | 3/1990 | Freij | 134/38 |

FOREIGN PATENT DOCUMENTS 081355 6/1983 European Pat. Off. ............ 252/171

OTHER PUBLICATIONS

US Stationary Invention Registration No. H300 & Hearst, Jul. 7, 1987.

*Primary Examiner*—Paul Lieberman
*Assistant Examiner*—Linda D. Skaling
*Attorney, Agent, or Firm*—Haugen and Nikolai

[57] ABSTRACT

A quasi-azeotropic stripper composition for the removal of paint or other organic coatings from metallic surfaces and including a formulation containing 1-10% by weight of an alcoholate activator consisting of sodium methoxide, 10-14 20% by weight of a coupling agent and co-solvent consisting of methanol, and 70-89% by weight of an aprotic polar solvent consisting essentially of N-methyl-2-pyrrolidone. The formulation is desirable for use in the work place since it is non-halogenated, is relatively non-volatile under normal ambient conditions, and also possesses a reasonably useful and high flash point.

4 Claims, No Drawings

COATING REMOVER AND PAINT STRIPPER CONTAINING N-METHYL-2-PYRROLIDONE, METHANOL, AND SODIUM METHOXIDE

BACKGROUND OF THE INVENTION

The present invention relates generally to a paint stripper composition and formulation, and more specifically to such a formulation which functions as an organic coating remover particularly adapted for use on non-ferrous metallic substrates. The formulation of the present invention is particularly desirable for use in the work place since it is nonhalogenated, property, is relatively nonvolatile under normal ambient conditions, and also possesses a reasonably useful and high flash point.

At the present time, formulations and methods for removal of organic coatings from metallic substrates usually involve one or more of the following techniques:

1. Chemical removal:
   (a) use of halogenated solvent-based stripper requiring either immersion or brush-on application. Such strippers are either:
       (1) organic acid activated;
       (2) neutral; or
       (3) alkaline activated;
   (b) use of aqueous sodium hydroxide solutions with high boiling point additives in immersion systems. In these applications, both temperatures typically range from between 200° F.–250° F.
2. Mechanical removal:
   (a) use of high-pressure surface blasting with abrasive media, such as sand-blasting or the like.
   (3. Thermal removal:
   (a) use of high temperature burn-off ovens;
   (b) use of molten salt baths;
   (c) use of cryogenic materials and techniques.

While these methods have been found effective in the removal of organic coatings from metallic articles, their use in connection with or upon non-ferrous metallic substrates is extremely limited. For example, the following characteristics and/or properties of materials utilized and the techniques employed frequently include the following:

(1) the chemical formulation employed is toxic;
(2) the formulation is corrosive, particularly upon contact with non-ferrous metals;
(3) alterations in surfaces and/or dimensions in articles may occur due to chemical and/or mechanical abrasion;
(4) possible distortion of metallic articles occurring during exposure to conditions found in burn-off ovens, or from immersion in high temperature molten-salt baths; and/or
(5) the extremely high cost of the use of cryogenic techniques.

For economic reasons, therefore, a common practice in industry is to scrap rejected painted non-ferrous parts and thereafter re-melt the material forming the article to reform it as a new article. Frequently the melting of rejected painted non-ferrous metallic articles is less expensive than exposure to a high quality stripping operation.

The present invention is useful for the treatment of rejected painted parts, particularly when melting is either impractical or cannot be undertaken on a cost-effective basis. This is of particular concern when dealing with parts and/or components having strict dimensional tolerances, or when the article may be applied in areas where hydrogen embrittlement will cause stress fracturing when the part or component is subjected to significant pressure gradients. Furthermore, the presently utilized techniques are found to be impractical whenever exposure to alloy forming materials (smut formation) is undesirable.

With regard to chemical removal of organic coatings from metallic articles, methylene chloride based formulations are presently commonly used. However, methylene chloride is now considered to be an undesirable material, and the United States Environmental Protection Agency has characterized the material as having possible carcinogenic effects in humans. Furthermore, methylene chloride has been listed by the Agency as a Total Toxic Organic and as such, its presence in rinse waters cannot be permitted to exceed 2.13 ppm. As a chlorinated solvent, methylene chloride is further harmful to the environment and may ultimately cause depletion of the ozone layer. The American Conference of Governmental Industrial Hygienists (ACIGH) has established a threshold limit value (TLV) of 50 ppm for this material. Additionally, the Occupational Safety Hazard Association (OSHA) has established a lower permissible exposure level (PEL) of only 500 ppm. Accordingly, it is anticipated that the use of methylene chloride will be more highly restricted in the future.

Methylene chloride strippers or coating removers are typically activated by relatively low molecular weight organic acids such as formic acid, acetic acid, and propionic acid. These materials typically have a very noxious odor, and have been given low TLV values as established by the ACIGH, and low PEL values as established by OSHA. These values currently are as follows:

| Organic Acid | ACIGH TLV (ppm) | OSHA PEL (ppm) |
| --- | --- | --- |
| Formic acid | 5 | 5 |
| Acetic acid | 10 | 10 |
| Propionic acid | 10 | Not established |
| Cresylic acid | 5 | 5 |

Furthermore, these organic acids may attack the surfaces of certain non-ferrous metallic substrates, and as such, are deemed undesirable. Subsequent application of the articles or parts so treated may result in hydrogen embrittlement, substrate deterioration, or changes in dimensional tolerances, as well as exposure to certain alloy-forming components.

Certain methylene chloride based stripper formulations are alkaline activated. The most common alkaline component in such strippers is either ammonium hydroxide or a volatile organic amine such as ethylenediamine. Both ammonium hydroxide and ethylenediamine emit toxic fumes and have been assigned low TLV values and low PEL values by ACIGH and OSHA, respectively. Additionally, exposure of articles fabricated from brass may suffer from stress corrosion cracking upon exposure to amines. The TLV and PEL values as established by the relevant governmental agencies and assigned to these components are as follows:

| Alkaline Activator | ACIGH TLV (ppm) | OSHA PEL (ppm) |
| --- | --- | --- |
| Ammonium hydroxide | 25 | 50 |

| Alkaline Activator | ACIGH TLV (ppm) | OSHA PEL (ppm) |
|---|---|---|
| Ethylenediamine | 10 | 10 |

The fumes emitted by formulations containing ammonium hydroxide or ethylenediamine are both noxious and toxic. Thus, their use is limited in an industrial setting, and in the future may become even more limited.

SUMMARY OF THE INVENTION

In accordance with the present invention, a non-halogenated solent base stripper or organic coating remover is provided which and is effective for removal and/or stripping of coatings at a rapid and practical rate basis. The formulations of the present invention are particularly adapted for immersion application, although other application techniques including brushing, dipping, or the like may be employed. The formulations of the present invention are particularly adaptable for use on non-ferrous parts and components, and may find application for ferrous components as well. Because of its relatively safe flash point, the nonhalogenated strippers of the present invention are compatible for most conditions normally found in the work place.

Briefly, the stripper composition of the present invention includes an alcoholate activator selected from the group consisting of sodium methoxide (sodium methylate), a suitable alkali metal alcoholate, a coupling agent and co-solvent comprising an alcohol having a carbon chain with the number of carbon atoms equivalent to that in the alcoholate activator, along with an aprotic polar solvent consisting essentially of N-methyl-2-pyrrolidone. These components, when mixed in a formulation, have been found effective for stripping and coating removal operations, and furthermore have been found to be relatively safe for use in the work place.

Besides being free of methylene chloride, and being activated by other than volatile amines, the formulations of the present invention are considered non-carcinogenic, non-phenolic, non-organic acid containing, and inert to non-ferrous metallic substrates. The formulations of the present invention are useful at ambient temperatures, and function by dissolving the organic coating to insure complete stripping of the coating and any overspray. Being water soluble, the formulations of the present invention are relatively easily removed from the surface of work articles through water rinse.

Therefore, it is a primary object of the present invention to provide a non-halogenated solvent based paint stripper or organic coating remover which may be employed at ambient temperatures, and which is effective for complete removal of such coatings from metallic substrates.

It is a further object of the present invention to provide an improved solvent based stripper which is water soluble, and hence relatively easily rinsed from the substrate surface following use.

It is yet a further object of the present invention to provide an improved stripper for removal of organic coatings from the surface of metallic substrates which is based upon formulations consisting of sodium methoxide, methanol, and N-methyl -2-pyrrolidone.

It is yet a further object of the present invention to provide a stripper and/or organic coating remover which substantially dissolves the organic film rather than merely lifting it from or otherwise destroying its adherence to the surface of the substrate, thus insuring complete removal of the coating in either recessed or blind areas, and also in areas of over-spray where films may be present.

Other and further objects of the present invention will become apparent to those skilled in the art upon a study of the following specification and appended claims.

DESCRIPTION OF THE PREFERRED EMBODIMENT

In accordance with the present invention, the following specific examples are provided:

EXAMPLE 1

A paint stripper and/or organic coating remover composition is formulated as follows:

| Component | Percent by Weight |
|---|---|
| Sodium methoxide (sodium methylate) | 5% |
| Methyl alcohol | 15% |
| N-methyl-2-pyrrolidone | 80% |

This formulation is effective for paint stripping and organic coating removal operations. As indicated above, this mixture is and has been found to have a flash point above about 130° F. TOC, thereby rendering it relatively safe for use in typical industrial settings.

UTILIZATION TEST A

A baking enamel on a zinc diecast part was submerged in the composition of Example 1 in an agitated soak solution for a period of five minutes, at which time the enamel coating was completely dissolved and brought into solution. After stripping the zinc diecast part, it was permitted to remain in the solution for an additional 72 hours, at which time no visual attack on the component was observed or noted.

UTILIZATION TEST B

A polyester powder coated aluminum diecast part having a paint mil thickness of 3.6 mils was exposed to the composition of Example 1 in an agitated immersion system for 20 minutes. At the end of the 20-minute period, the polyester powder coating was completely removed. Thereafter, the stripped aluminum part was permitted to remain in the formulation for an additional 72 hours, whereupon visual inspection noted no attack on the surface of the metallic substrate.

The same polyester powder coating was removed in a bath under static conditions after 30 minutes exposure, followed by a low pressure, low volume water rinse.

UTILIZATION TEST C

A urethane powder coated aluminum extrusion having a paint mil thickness of 1.2 mil was exposed to the formulation of Example 1 in an agitated soak for five minutes. At the end of the five-minute period, the coating was completely removed from the aluminum extrusion. The stripped aluminum extrusion was permitted to remain in the formulation to an additional 72 hours, after which visual inspection revealed no attack on the metallic substrate.

UTILIZATION TEST D

A high solids polyester coating was removed from a brass part having a paint mil thickness of 1.0 mil in an agitated soak for three minutes. At the end of the three-minute period, the coating was completely removed from the brass part. The stripped brass part was permitted to remain submerged in the formulation of Example 1 for an additional 72 hours, after which visual inspection revealed no attack on the brass part.

EXAMPLE 2

A paint stripper and/or organic coating remover composition is formulated as follows:

| Component | Percent by Weight |
| --- | --- |
| Sodium methoxide | 10% |
| Methyl alcohol | 10% |
| N-methyl-2-pyrrolidone | 80%. |

This formulation functions with good results.

EXAMPLE 3

A paint stripper and/or organic coating remover composition is formulated as follows:

| Component | Percent by Weight |
| --- | --- |
| Sodium methoxide | 1% |
| Methyl alcohol | 10% |
| N-methyl-2-pyrrolidone | 89%. |

This formulation functions with good results.

EXAMPLE 4

A paint stripper and/or organic coating remover composition is formulated as follows:

| Component | Percent by Weight |
| --- | --- |
| Sodium methoxide | 10% |
| Methyl alcohol | 20% |
| N-methyl-2-pyrrolidone | 70%. |

This formulation functions with good results.

GENERAL EXAMPLE

A paint stripper and/or organic coating remover composition is formulated as follows:

| Component | Useful Range, Percent by Weight |
| --- | --- |
| N-methyl-2-pyrrolidone | 70–89% |
| Methyl alcohol | 10–20% |
| Sodium methoxide | balance. |

One feature of the invention is the utilization of the alkaline metallic alcoholate activator, herein sodium methoxide. In the past, those amines which have been used as activators in non-methylene chloride based stripper formulations were volatile, and hence created a hazard to the worker. Additionally, the volatility of the amine component rendered the alkalinity of the stripper a variable which required relatively constant attention and periodic replenishment. Activators utilized in non-methylene chloride based strippers included ethanolamine, diethanolamine, diethylaminoethanol, and the like. Their volatility is somewhat aggravated because of their utilization in solutions heated to a temperature range from between 200° F.–250° F. The TLV values and PEL values of these amines are listed hereinbelow:

| Amine | ACIGH TLV (ppm) | OSHA PEL (ppm) | Vapor Density (Air = 1) |
| --- | --- | --- | --- |
| Ethanolamine | 3 | 3 | 2.11 |
| Diethanolamine | 3 | Not established | 3.6 |
| Diethylaminoethanol | 10 (skin) | 10 | 4.0 |

In the present formulations, alkali metal alcoholates are, of course, preferred over ammonium alcoholates because of their low or non-volatile characteristics. Because sodium methoxide is relatively non-volatile, there is essentially no reduction or loss in alkalinity due to evaporation of this component during use. In this instance, evaporation of the component is substantially retarded since sodium methoxide reacts with moisture contained in the ambient so as to form a thin surface film or layer of insoluble sodium hydroxide at the air-solution interface.

The methanol component contained in the formulation functions as a coupling agent for the sodium methoxide, and also as a cosolvent.

The initiator for the paint removal is the principal solvent component, this being N-methyl-2-pyrrolidone. This material is an aprotic polar organic solvent, and has been found to be a highly effective initiator in the formulations of the present invention. The polar nature of the material renders it water soluble, and hence a desirable component for achieving ease of removal through rinsing. While other initiators are known, N-methyl-2-pyrrolidone is highly desirable due to its relatively low toxicity, and its effectiveness in stripping at relatively high rates. Furthermore, N-methyl-2-pyrrolidone has an acceptable flash point, and furthermore is reasonably non-volatile at normal ambient conditions.

In the formulations of the present invention, the activator, initiator, and coupling agent-co-solvent are present in ranges providing extended tank life and a relatively low and acceptable flash point. The formulations of the present invention have been found to be synergistic, particularly since the individual components, sodium methoxide, methanol, and/or N-methyl-2pyrrolidone are by themselves ineffective in stripping paint and/or removing organic coatings within a practical time limit. Combinations of any two of the components renders such formulations ineffective in such removal within practical time limits as well. Practical time limits are, of course, readily achieved with the formulations of the present invention.

By way of functional characteristics, upon immersion application upon non-ferrous metallic substrates, the formulations appear to dissolve the organic paint film from the outer surface inwardly until the paint film is completely dissolved and brought into solution. Because of its function in dissolving the film, the time required for paint removal is, of course, directly proportional to the mil thickness of the coating. Agitation of the solution enhances the rate by flushing-off the outer exposed layer, so as to expose fresh layers to the solution.

Although the exact functional mechanism of the formulations of the present invention are not fully understood, it appears that the removal mechanism is related to saponification, since the formulation in its pure form is non-foaming, and the formulation with dissolved coatings therein may produce a modest foam and/or froth. It is believed that the high alkalinity which is attributed to the sodium methoxide encourages reaction with the various organic coatings so as to form an alkaline-soluble soap that rinses free upon exposure to a water rinse.

DISCUSSION OF ROLE OF COMPONENTS

Sodium methoxide is present in the formulations within a range of between about 1% up to about 10% by weight. The amount of sodium methoxide has a direct effect on the tank life of the composition, as well as the low flammability of the solution. As the sodium methoxide content increases, a similar increase in methanol content is necessary in order to couple the sodium methoxide into the N-methyl-2-pyrrolidone. Accordingly, and conversely, as the sodium methoxide concentration drops, the quantity of methanol needed for coupling of the sodium methoxide into the solution drops proportionately.

Methanol is present in the formulations within a range of between about 10% to 20% by weight. The amount of sodium methoxide and methanol present in the solution correlates with the flash point of the composition. When efforts were undertaken to modify the formulation by replacement of the methanol with a solvent having a higher flash point, such as ethylene glycol monobutylether or diethylene glycol monobutylether, it has been found that the use of such glycol ethers resulted in an overall composition with a flash point of below 100° F. As such, the modified compositions were found undesirable for use in normal industrial applications. Since N-methyl-2-pyrrolidone completes the balance of the composition, this component is present within a range of between about 70% and 89% by weight. The N-methyl-2-pyrrolidone component forms a mixture with the sodium methoxide and methanol so as to provide a composition with a flash point above about 130° F. TOC. In other words, N-methyl-2-pyrrolidone raises the flash point of the overall composition to a point where it can be used relatively safely in an industrial setting.

The compositions have been found effective for use under ambient conditions for removal of films formed from polyester, urethane, enamel, and alkyd resins in immersion or agitated immersion applications. These formulations are effective with relatively short exposure times followed by water rinse.

What is claimed is:

1. A paint stripper composition for the removal of organic coatings from the surface of metallic substrates consisting of the following formulation:

| Component | Percent by Weight |
| --- | --- |
| (a) sodium methoxide activator; | 1–10% |
| (b) a coupling agent and co-solvent consisting of methanol; and | 10–20% |
| (c) an aprotic polar solvent consisting of N-methyl-2-pyrrolidone | 70–89% |

2. The stripper composition of claim 1 being particularly characterized in that the alcoholate activator is sodium methoxide present in the amount of 5%.

3. The quasi-azeotropic paint stripper composition of claim 1 being particularly characterized in that the composition consists of the following formulation:

| Component | Percent by Weight |
| --- | --- |
| (a) an alcoholate activator consisting of sodium methoxide | 5% |
| (b) a coupling agent and co-solvent consisting of methanol; and | 15% |
| (c) an aprotic polar solvent consisting of N-methyl-2-pyrrolidone | 80%. |

4. The paint stripper composition of claim 1 having a flash point greater than 130° F. TOC.

* * * * *

UNITED STATES PATENT AND TRADEMARK OFFICE
CERTIFICATE OF CORRECTION

PATENT NO. : 5,073,287

DATED : December 17, 1991

INVENTOR(S) : Wayne Harelstad

It is certified that error appears in the above-identified patent and that said Letters Patent is hereby corrected as shown below:

Column 8, line 22, insert "paint" before "stripper".

Column 8, line 26, delete "quasi-azeotropic".

Signed and Sealed this

Sixteenth Day of March, 1993

Attest:

STEPHEN G. KUNIN

Attesting Officer

Acting Commissioner of Patents and Trademarks